United States Patent
Marsolek

(10) Patent No.: US 9,574,311 B1
(45) Date of Patent: Feb. 21, 2017

(54) OSCILLATION WITH VIBRATORY POD DESIGN

(71) Applicant: Caterpillar Paving Products Inc., Brooklyn Park, MN (US)

(72) Inventor: John Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 13 days.

(21) Appl. No.: 14/810,733

(22) Filed: Jul. 28, 2015

(51) Int. Cl.
*E01C 19/00* (2006.01)
*E01C 19/28* (2006.01)
*E01C 19/26* (2006.01)
*F16H 7/02* (2006.01)
*F16H 57/023* (2012.01)

(52) U.S. Cl.
CPC ............. *E01C 19/286* (2013.01); *E01C 19/26* (2013.01); *E01C 19/282* (2013.01); *F16H 7/02* (2013.01); *F16H 57/023* (2013.01)

(58) Field of Classification Search
CPC ....... E01C 19/26; E01C 19/282; E01C 19/286
USPC .................................................. 404/72, 117
See application file for complete search history.

(56) References Cited

U.S. PATENT DOCUMENTS

| 6,929,421 | B2 | 8/2005 | Potts et al. |
| 7,066,681 | B2 | 6/2006 | Paske |
| 2010/0147090 | A1 | 6/2010 | Kuerten |
| 2010/0189501 | A1 | 7/2010 | Grabnic et al. |

FOREIGN PATENT DOCUMENTS

| CN | 103243630 A | 8/2013 |
| CN | 203847972 U | 9/2014 |
| JP | 2013014984 A | 1/2013 |

*Primary Examiner* — Raymond W Addie
(74) *Attorney, Agent, or Firm* — Baker & Hostetler LLP

(57) ABSTRACT

A vibratory pod system for a vibratory compactor includes a central bulkhead defining a first mounting orifice and a plurality of second mounting orifices. The first mounting orifice is defined at a center of the central bulkhead and the second mounting orifices are defined at a location radially outward from the first mounting orifice. The vibratory pod system includes a transfer bearing hub supporting a transfer shaft for transferring rotary motion, and the transfer bearing hub is mounted within the first mounting orifice. The vibratory pod system includes a plurality of vibratory pods, each of the vibratory pods having a pod shell for rotatably supporting an eccentric mass. Each of the vibratory pods is partially inserted through one of the plurality of second mounting orifices and mounted to the central bulkhead.

20 Claims, 7 Drawing Sheets

OSCILLATION WITH VIBRATORY POD DESIGN

TECHNICAL FIELD

The present disclosure relates generally to a vibratory compactor machine, and more particularly, to a vibratory compactor machine generating oscillation with a vibratory pod design.

BACKGROUND

Compactors are machines used to compact initially loose materials, such as asphalt, soil, gravel, and the like, to a densified and more rigid mass or surface. For example, during construction of roadways, highways, parking lots, and the like, loose asphalt is deposited and spread over the surface to be paved. One or more compactors, which may be self-propelled machines, travel over the surface whereby the weight of the compactor compresses the asphalt to a solidified mass. The rigid, compacted asphalt has the strength to accommodate significant vehicular traffic and, in addition, provides a smooth, contoured surface that may facilitate traffic flow and direct rain and other precipitation away from the road surface. Compactors are also utilized to compact soil or recently laid concrete at construction sites and on landscaping projects to produce a densified, rigid foundation on which other structures may be built upon.

Various types of compactors are known in the art. For example, some compactors include a rotatable roller drum that may be rolled over the surface to compress the material underneath. In addition to utilizing the weight of the roller drum to provide the compressive forces that compact the material, some compactors are configured to also exert a vibratory three on the surface. As can be appreciated, the vibratory forces assist in further compacting the loose materials into a dense, uniformly rigid mass. To generate the vibratory forces, one or more weights or masses may be disposed inside the roller drum at a position off-center from the axis line around which the roller drum rotates. As the roller drum rotates, the off-center or eccentric position of the masses induce oscillatory or vibrational forces to the drum that are imparted to the surface being compacted. In some applications, the eccentrically positioned masses are arranged to rotate inside the roller drum independently of the rotation of the drum.

U.S. Pat. No. 7,213,479 discusses and shows a vibratory mechanism in which two vibratory shafts are housed within a roller drum. The two vibratory shafts are supported by and disposed between a first bulkhead and a second bulkhead of roller drum. The two vibratory shafts are driven via a drivetrain using a hydraulic motor. However, maintenance of the vibratory shafts and/or the associated drivetrain may be cumbersome and time consuming due to the location, mass, and assembly of the vibratory mechanism within the roller drum. Thus, performing even minor repairs to the vibratory mechanism could take days. This resulting down time may result in extended loss of use of the machine and increased repair labor costs.

SUMMARY

According to one aspect of the disclosure, a vibratory pod system for a vibratory compactor machine includes a central bulkhead defining a first mounting orifice and a plurality of second mounting orifices. The first mounting orifice is defined at a center of the central bulkhead and the second mounting orifices are defined radially outward from the first mounting orifice. The vibratory pod system includes a transfer bearing hub supporting a transfer shaft for transferring rotary motion, and the transfer bearing hub is mounted within the first mounting orifice. The vibratory pod system includes a plurality of vibratory pods, each of the vibratory pods having a pod shell for rotatably supporting an eccentric mass. Each of the vibratory pods is partially inserted through one of the plurality of second mounting orifices and mounted to the central bulkhead.

According to another aspect of the disclosure, a vibratory compactor machine includes a frame having a plurality of support arm members, a drum roller having a cylindrical drum shell housing a pair of outer supporting bulkheads and a central bulkhead, and a vibratory pod system including a plurality of vibratory pods supported on the central bulkhead. The drum roller is supported by the plurality of support arm members on opposite axial sides of the drum rollers via the pair of outer supporting bulkheads. The central bulkhead defines a first mounting orifice and a plurality of second mounting orifices, the first mounting orifice being defined at a center of the central bulkhead and the second mounting orifices being defined radially outward from the first mounting orifice. Each of the vibratory pods have a pod shell for rotatably supporting an eccentric mass, and each of the vibratory pods is partially inserted through one of the plurality of second mounting orifices and mounted to the central bulkhead.

According to another aspect of the disclosure, a method of performing maintenance on a vibratory pod system of a vibratory compactor machine includes a step of locating the vibratory pod system mounted to a central bulkhead of a drum roller while the drum roller is rotatably mounted to the vibratory compactor machine via support arm members, supporting bulkheads, and transfer plates. The method further includes a step of removing a drive belt, a drive chain, or a drive gear system associated with the vibratory pod system via an opening defined between the supporting bulkheads and the transfer plates, while the drum roller is rotatably mounted to the vibratory compactor machine via the support arm members, the supporting bulkheads, and the transfer plates.

DETAILED DESCRIPTION

Figure 1:
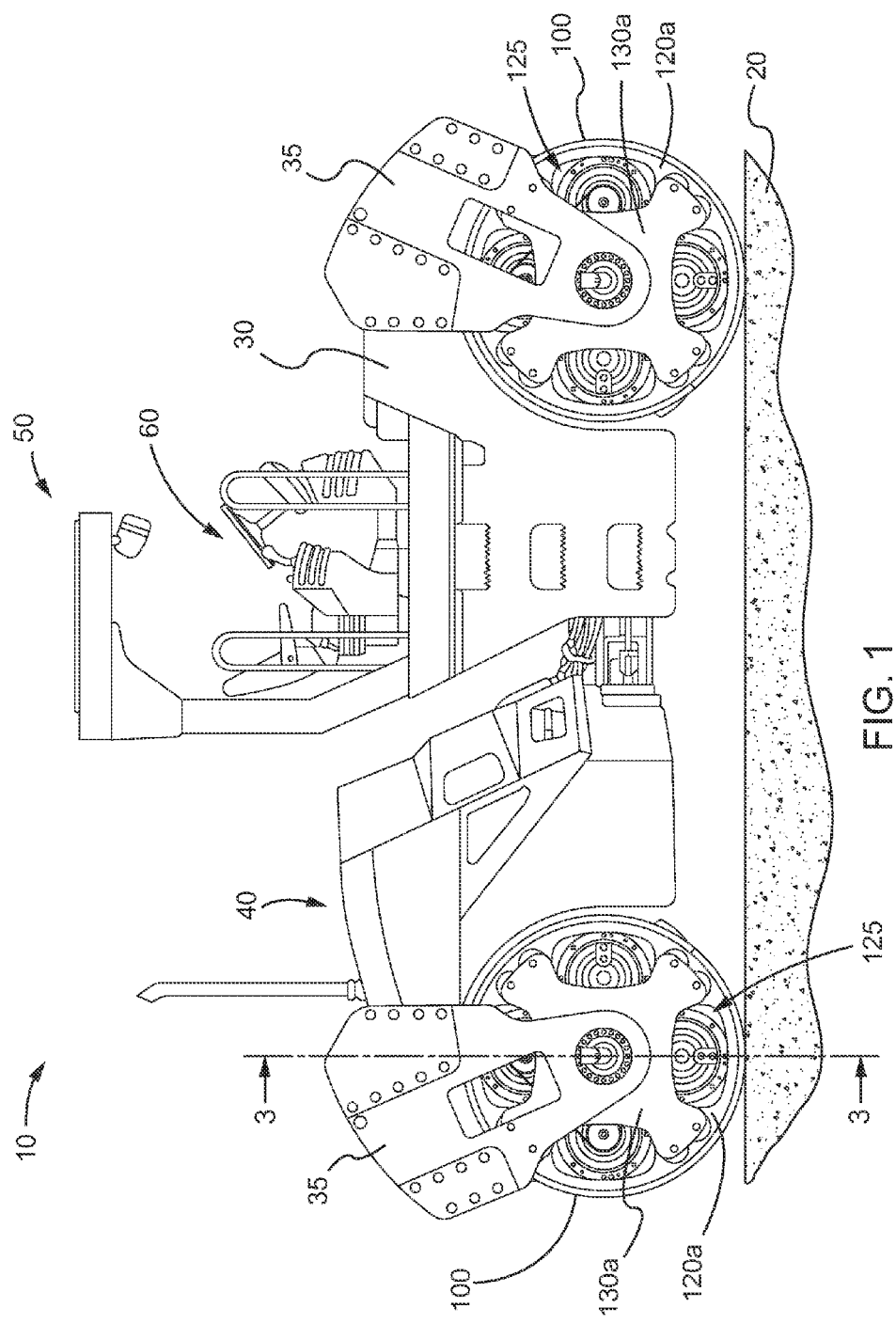
FIG. 1 is a side view of an exemplary vibratory compactor machine including at least one roller drum in accordance with aspects of the disclosure.

Aspects of the disclosure will now be described in detail with reference to the drawings, wherein like reference numerals refer to like elements throughout, unless specified otherwise.

FIG. 1 shows a compactor machine 10 in accordance with aspects of the present disclosure. In one aspect, the compactor machine 10 may be operated to travel over a ground surface 20 in order to compact and/or increase a density of the ground surface 20, which may include loose material, such as soil, gravel, sand, landfill, and/or other bituminous mixtures. The compactor machine 10 may include a plurality of drum rollers 100, and the plurality of drum rollers 100 may be mounted to a body or frame 30 of the compactor machine 10. The frame 30 of the compactor machine 10 may support and house an engine 40 for generating motive power for rotating one or more of the drum rollers 100. The compactor machine 10 may further include an operator's cab 50 which may include mechanical and/or electric controls 60 associated with the compactor machine 10. Although the compactor machine 10 of FIG. 1 is illustrated with two drum rollers 100, it can be appreciated by one skilled in the art in view of the present disclosure that the compactor machine 10 may include a single drum roller 100, or more than two drum rollers 100 depending on the application for the machine.

Each of the drum rollers 100 may be rotatably supported by the frame 30 via one or more support arm members 35. In one aspect, a pair of support arm members 35 may rotatably support each drum roller 100 on opposite axial sides of the drum rollers 100.

Figure 2:
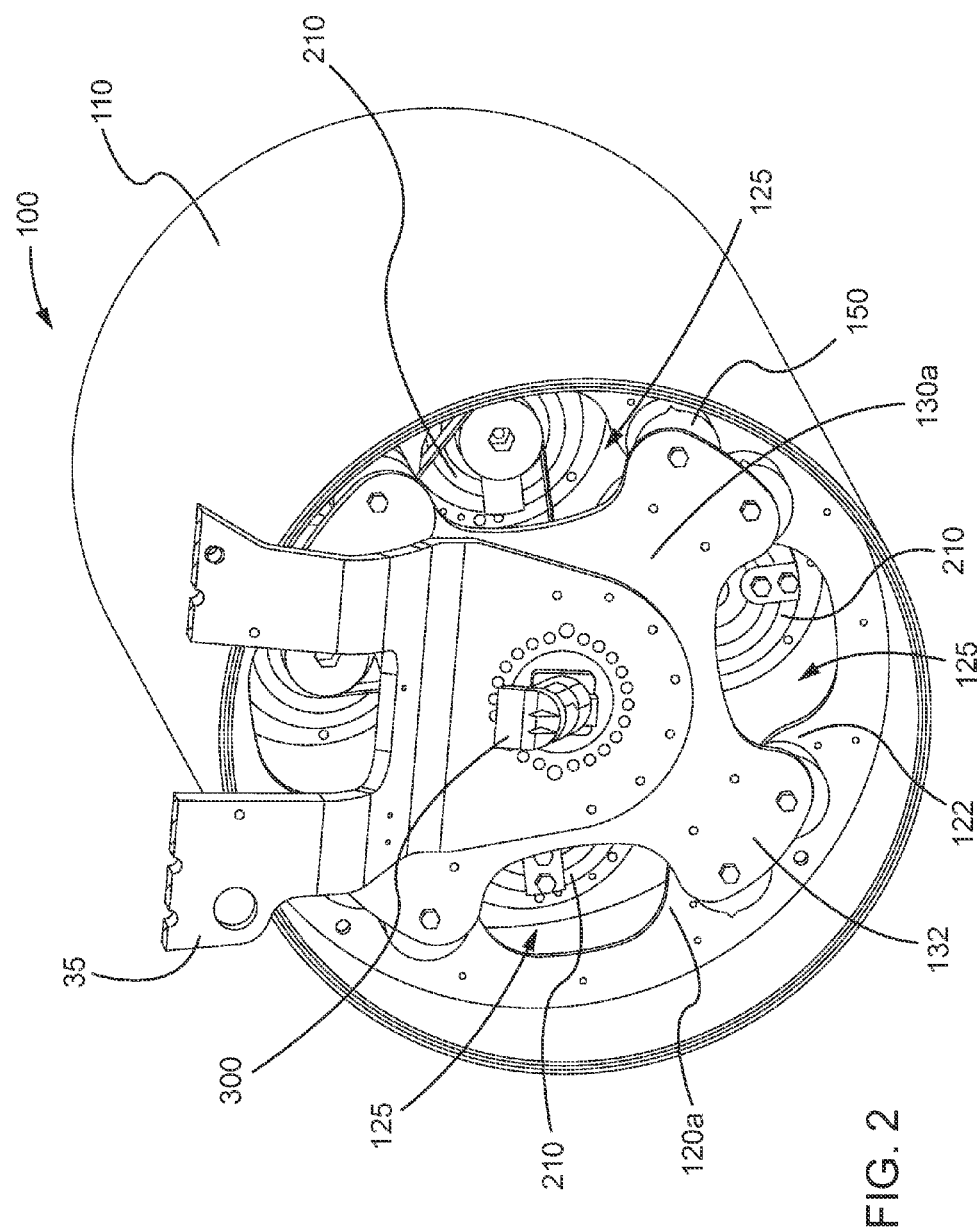
FIG. 2 is a perspective view of an exemplary roller drum including a vibratory pod design in accordance with aspects of the disclosure.
Figure 3:
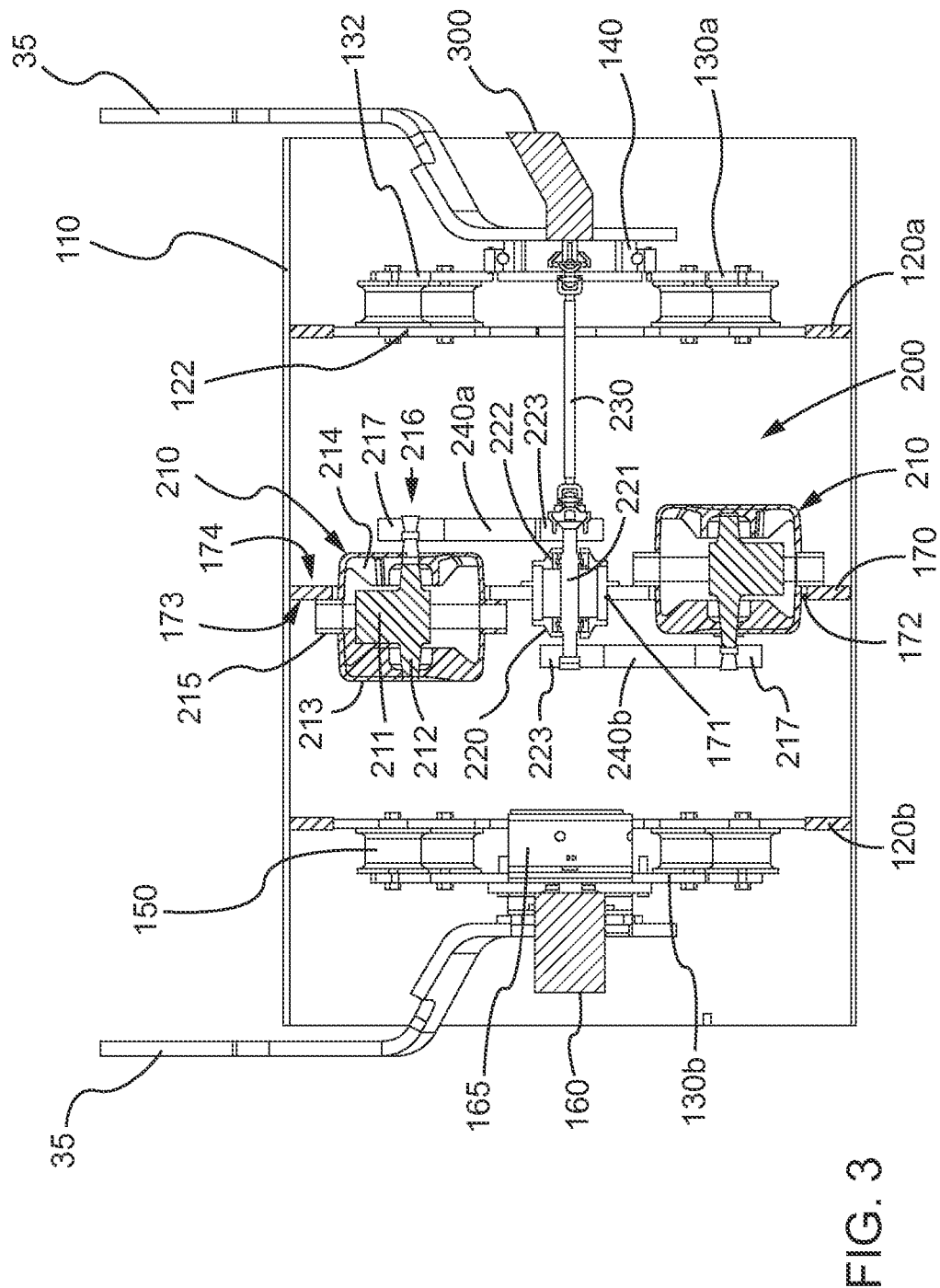
FIG. 3 is a cross-sectional view of the roller drum taken along line 3-3 of FIG. 1 illustrating an exemplary internal arrangement of the roller drum in accordance with aspects of the disclosure.

Referring to FIGS. 2 and 3, the drum roller 100 may include a cylindrical drum shell 110 secured to and housing a pair of outer supporting bulkheads 120a, 120b within an inner circumference of the cylindrical drum shell 110. In one aspect, the outer supporting bulkheads 120a, 120b may be formed integrally with the cylindrical drum shell 110. Alternatively, the outer supporting bulkheads 120a, 120b may be separately fastened or welded to the cylindrical drum shell 110. In one aspect, the outer supporting bulkhead 120a located on a non-driven side of the cylindrical drum shell 110 may be rotatably supported by the support arm member 35 via a transfer plate 130a and a bearing 140. In one aspect, a plurality of elastomeric isolation mounts 150 may be mounted to and provided between the outer supporting bulkhead 120a and the transfer plate 130a to isolate vibratory forces that would otherwise be transmitted to an operator and the compactor machine 10 via the frame 30.

In one aspect, the outer supporting bulkhead 120b located on a driven side of the cylindrical drum shell 110 may be rotatably supported by the support arm member 35 via a transfer plate 130b, a drive motor 160, and a gearbox 165. The drive motor 160 may be fluidly or mechanically connected to the engine 40 of the compactor machine 10 to rotate and drive the drum roller 100. In one aspect, a plurality of elastomeric isolation mounts 150 may be mounted to and provided between the outer supporting bulkhead 120b and the transfer plate 130b to isolate vibratory forces that would otherwise be transmitted to the compactor machine 10 via the frame 30.

As shown in FIGS. 1-4, the transfer plates 130a, 130b and the outer supporting bulkheads 120a, 120b may be configured to define at least one opening 125 for providing access to one or more vibratory pods 210, as will be discussed in greater detail below. In one aspect, the transfer plates 130a, 130b may include a plurality of radially outward extending portions 132, and each of the radially outward extending portions 132 may include at least one attachment point for at least one of the plurality of elastomeric isolation mounts 150. In one aspect, the outer supporting bulkheads 120a, 120b may include a plurality of radially inward extending portions 122, and each of the radially inward extending portions 122 may include at least one attachment point for at least one of the plurality of elastomeric isolation mounts 150. In one aspect, each of the outward extending portions 132 and each of the inward extending portions 122 may include at least two attachment points for securing a pair of the elastomeric isolation mounts 150 therebetween.

In one aspect, each of the outer supporting bulkheads 120a, 120b may include a plurality of the radially inward extending portions 122, and each of the transfer plates 130a, 130b may include a corresponding number of radially outward extending portions 132. In one aspect, each of the radially inward extending portion 122 may be paired up with and mounted to an outward extending portion 132 in order to rotatably couple the drum roller 100 to the support arm members 35 of the compactor machine 10. In one aspect, the outer supporting bulkheads 120a, 120b may define a generally clover-shaped cutout, while the transfer plates 130a, 130b may define a generally clover-shaped outer perimeter. Other shapes defining a plurality of lobes or petals are of course contemplated. In one aspect, the openings 125 may be defined between each pair of coupled radially outward extending portions 122 and radially outward extending portions 132. In one aspect, the openings 125 may provide access to internal components with little to no disassembly of the drum rollers 100 or associated support and mounting structures. Although four radially inward extending portions 122 and four radially outward extending portions 132 are shown, other numbers of extending portions, such as 3, 5, 6, 7, or 8 extending portions, are of course contemplated.

Figure 5:
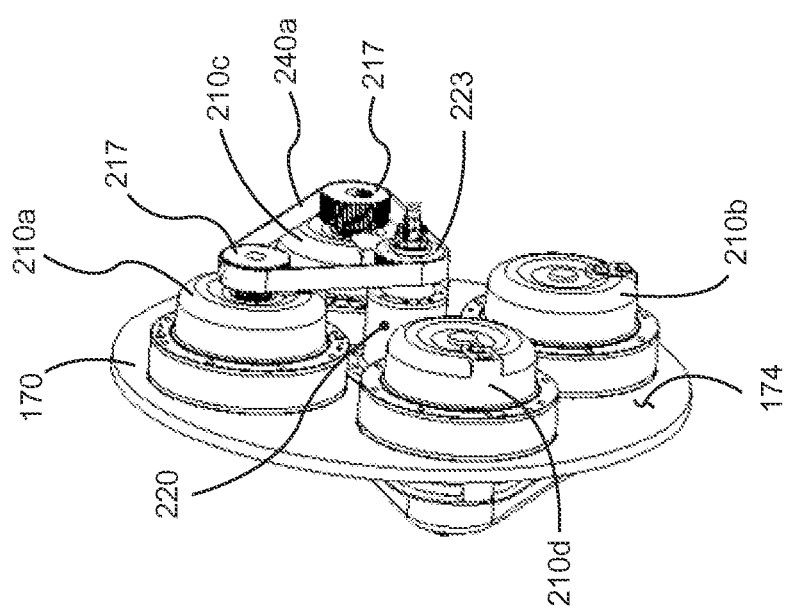
FIG. 5 is a perspective view of an exemplary arrangement of vibratory pods mounted to a central bulkhead in accordance with aspects of the disclosure.
Figure 6:
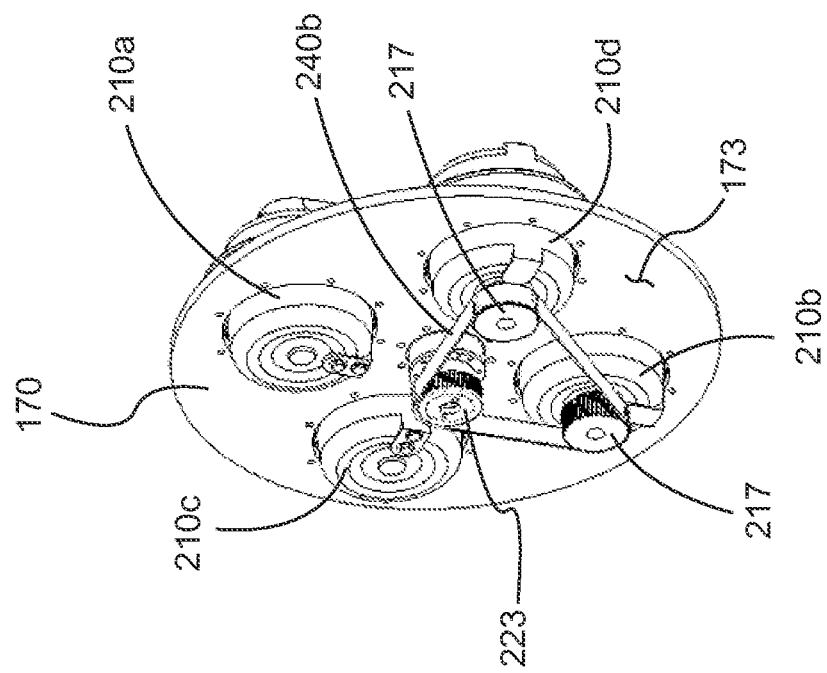
FIG. 6 is a second perspective view of the exemplary arrangement of vibratory pods mounted to the central bulkhead of FIG. 5 in accordance with aspects of the disclosure.
Figure 7:
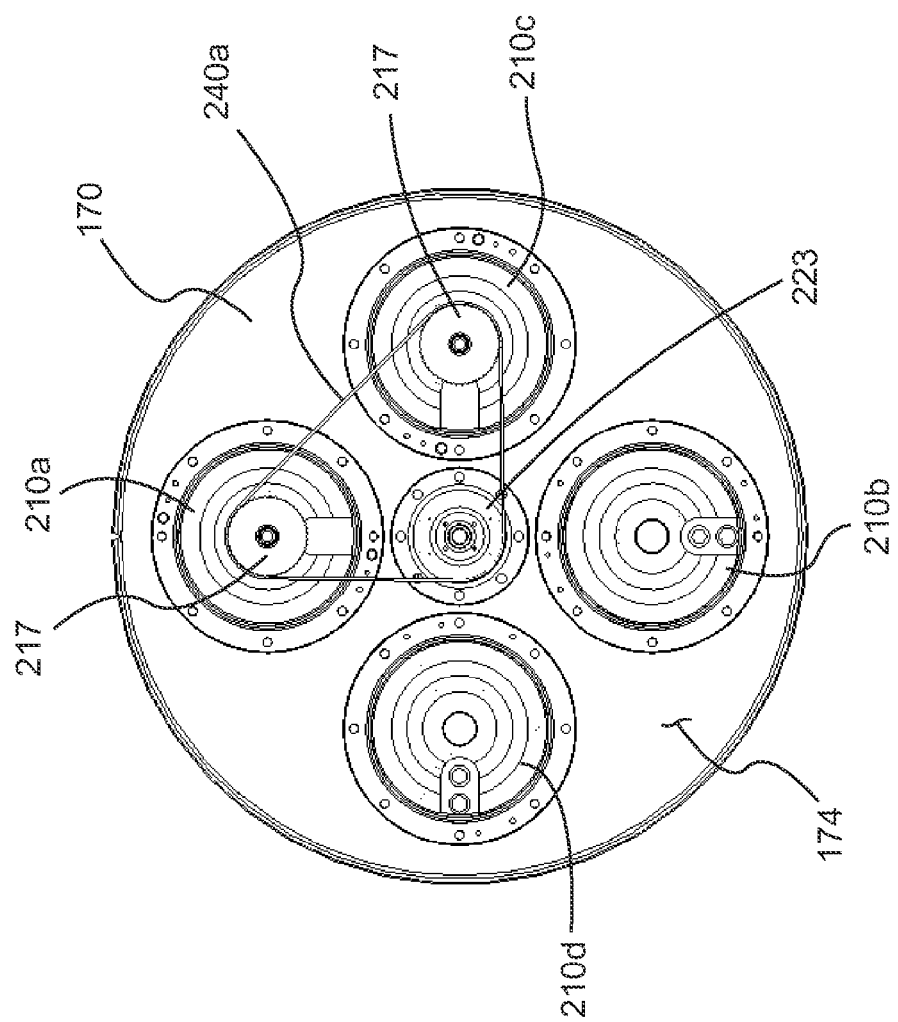
FIG. 7 is a side view of the exemplary arrangement of vibratory pods mounted to the central bulkhead of FIG. 5 in accordance with aspects of the disclosure.

Referring to FIGS. 3-7, in one aspect, the drum roller 100 may include a central bulkhead 170 for supporting a vibratory system 200. The central bulkhead 170 may define a first mounting orifice 171 and a plurality of second mounting orifices 172. In one aspect, as best shown in FIGS. 3 and 7, the first mounting orifice 171 may be defined at a center of the central bulkhead 170. In one aspect, the plurality of second mounting orifices 172 may be defined radially offset from the first mounting orifice 171 and offset from a central axis of the central bulkhead 170. In one aspect, the first mounting orifice 171 and the plurality of second mounting orifices 172 are circular. In one aspect, an outer diameter of the first mounting orifice 171 is smaller than an outer diameter of the plurality of second mounting orifices 172.

In one aspect, the drum roller 100 may include only a single central bulkhead 170 for supporting the vibratory system 200. In one aspect, the central bulkhead 170 may define an outer perimeter sized for insertion into and secured to an inner circumferential surface of the cylindrical drum shell of the drum roller 100. In one aspect, the outer perimeter of the central bulkhead 170 is sized to abut the inner circumferential surface of a drum roller 100.

Figure 4:
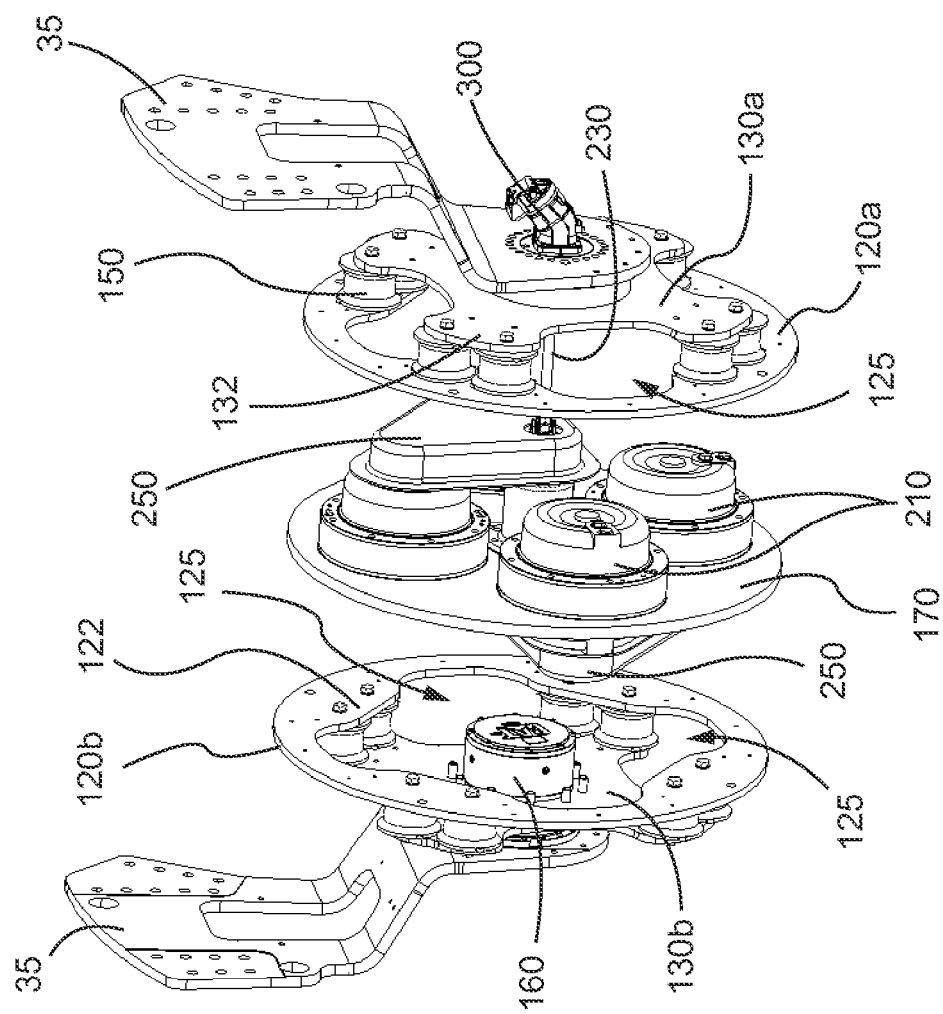
FIG. 4 is a perspective view of the exemplary internal arrangement of the roller drum of FIG. 3, with the external roller drum shell hidden, in accordance with aspects of the disclosure.

In one aspect, the vibratory system 200 may include at least one vibratory pod 210 and a transfer bearing hub 220. The transfer bearing hub 220 may include a transfer shaft 221 for transferring rotary motion to the at least one vibratory pod 210. The transfer shaft 221 may be rotatably supported by a plurality of transfer hub bearings 222 mounted at opposite ends of the transfer bearing hub 220. In one aspect, the transfer shaft 221 is sized to extend beyond both planar sides of the central bulkhead 170 while the transfer bearing hub 220 is mounted to the central bulkhead 170. In one aspect, as shown in FIG. 3 and FIG. 4 (which is illustrated with the cylindrical drum shell 110 hidden to show greater detail), the transfer shaft 221 may be coupled to a vibratory drive shaft 230, which in turn may be coupled to a motor 300 for driving the vibratory system 200. In one aspect, the motor 300 may be a hydraulic motor, and the hydraulic motor may be fluidly driven via the engine 40 of the compactor machine 10. In one aspect, the motor 300 may be mounted to one of the support arm members 35. In one aspect, the motor 300 may be mounted to the non-driven side of the cylindrical drum shell 110.

In one aspect, the vibratory system 200 may include between 2 to 16 vibratory pods 210 mounted to the central bulkhead 170. In one aspect, the vibratory system 200 may include 2, 4, 6, or 8 vibratory pods 210 depending on the application and size of the compactor machine 10 and the drum roller 100. In one aspect, the vibratory system 200 may include a total of 2 or 4 vibratory pods 210. Of course, other numbers of vibratory pods, including an odd number of pods may be selected depending on the application as will be appreciated by one skilled in the art in view of the present disclosure. In one aspect, where an even number of vibratory pods 210 is selected, each vibratory pod 210 of the plurality of vibratory pods may be mounted opposite or diametrically opposed to another pod 210 of the plurality of vibratory pods to form a pair. As shown in FIG. 3, the central bulkhead 170 may include a first face 173 and a second face 174. In one aspect, each pair of vibratory pods 210 may be mounted on opposite faces 173, 174 of the central bulkhead 170, or they may be mounted on a same face of the central bulkhead 170.

In one aspect, each pod 210 of the plurality of vibratory pods may be at least partially inserted through one of the plurality of second mounting orifices 172 and mounted to the central bulkhead 170. In one aspect, at least one vibratory pod 210 of the plurality of vibratory pods may include a flange 215 for securing the at least one vibratory pod to the first face 173 or to the second face 174 of the central bulkhead 170. The flange 215 may include a plurality of holes or apertures for receiving fasteners to secure the flange 215 of the vibratory pods 210 to the central bulkhead 170. In one aspect, the fasteners may include bolts, screws, rivets, anchors, and the like.

In one aspect, the at least one vibratory pod 210 of the plurality of vibratory pods partially extends through the one of the plurality of second mounting orifices 172 and is attached to the central bulkhead 170. In one aspect, the flange 215 may radially extend from the vibratory pods 210 to prevent the at least one vibratory pod 210 from passing through the one of the plurality of second mounting orifices 172. In one aspect, the flange 215 may be a continuously extending radial flange, and the flange 215 may define an outer radius that is larger than an inner radius of the plurality of second mounting orifices 172.

Referring to FIGS. 5-7, the vibratory system 200 may include a total of four vibratory pods 210. A first pair of the vibratory pods 210*a*, 210*b* may be mounted opposite from one another, in a radial direction, onto the central bulkhead 170, for example, at a 12 o'clock and 6 o'clock position, respectively. A second pair of the vibratory pods 210*c*, 210*d* may be mounted opposite from one another, in a radial direction, onto the central bulkhead 170, for example, at a 3 o'clock and 9 o'clock position, respectively. In one aspect, each vibratory pod 210*a*, 210*b*, 210*c*, 210*d* may be rotationally offset from an adjacent pod by 90 degrees. However, it is contemplated that a rotational offset may be reduced if more than four vibratory pods 210 are employed, such as by 45 degrees if eight vibratory pods 210 are used, or the rotation offset may be increased if two or three vibratory pods 210 are used.

In one aspect, each vibratory pod 210 of the plurality of vibratory pods may include an eccentric mass 211, which may be rotatably supported by a pod shaft 212. The eccentric mass 211 and the pod shaft 212 may be housed within a pod shell 213 (as shown in FIG. 3). The pod shell 213 may include one or more fins 214 to provide structural rigidity and to direct a flow of lubrication as the eccentric mass 211 is rotated. In one aspect, the pod shaft 212 may include a receiving end 216 extending from the pod shell 213 of the vibratory pod 210, and the receiving end 216 may include a gear or pulley 217. The pod shaft 212 may be rotatably coupled to the transfer shaft 221 to transfer rotary motion from the transfer shaft 221 to the eccentric mass 211. In one aspect, the pod shaft 212 may be rotatably coupled to the transfer shaft 221 via a drive belt or a drive chain 240*a*, 240*b*, or a drive gear system (not shown). In one aspect, the transfer shaft 221 may include a gear or pulley 223. In one aspect, the gear or pulley 223 of the pod shaft 212 may be drivingly coupled to the gear or pulley 223 of the transfer shaft 221 via the drive belt 240*a*. Other force transfer mechanisms such gears and sprockets are of course contemplated.

As discussed above, each pair of vibratory pods 210, which are disposed diametrically opposite from one another on the central bulkhead 170, may be mounted on opposite faces 173, 174 of the central bulkhead 170. In one aspect, as shown in FIGS. 5 and 6, the vibratory pods 210*a*, 210*c* may be mounted onto the first face 173 and may be driven by a common drive belt 240*a* located on a side of the second face 174. In one aspect, the vibratory pods 210*b*, 210*d* may be mounted onto the second face 174 and may be driven by a common drive belt 240*b* located on a side of the first face 173. In one aspect, where only two vibratory pods 210*a*, 210*b* are employed and mounted to the central bulkhead 170, as generally shown in FIG. 3, the drive belts 240*a*, 240*b* may be configured to drive only a single vibratory pod 210.

Referring back to FIG. 4, a cover 250 may be mounted to the vibratory pods 210*a*, 210*c*, which share the drive belt 240*a*. Similarly, the cover 250 may be mounted to the vibratory pods 210*b*, 210*d*, which share the drive belt 240*b*. In one aspect, the cover may prevent debris or foreign objects from striking, contacting, or collecting on drive train components associated with the vibratory pods 210*a*, 210*b*, 210*c*, 210*d*. The cover 250 may be configured to provide protection while enabling simple access to the drive train components, as will be discussed in further detail below.

INDUSTRIAL APPLICABILITY

This present disclosure relates generally to vibratory compactor machines, and more particularly, to a vibratory compactor machine generating oscillation using a vibratory pod design. As discussed above, the present disclosure is applicable to machines, which may include a drum roller, and may be operable for compacting and densifying a loose material such as asphalt, soil, gravel, and the like. For operators of such machines, it may be critical to reduce machine down time during maintenance and repairs in order to minimize repair duration and costs.

Installation and maintenance aspects of the vibratory system 200 housed within the drum roller 100 will now be described with reference to FIGS. 1-4.

During installation or maintenance of the vibratory system 200, it may be necessary for an operator to add, replace, and/or remove components associated with the vibratory system 200. In one aspect, it may be necessary to inspect, install, clean, or lubricate one or more vibratory pods 210, the transfer bearing hub 220, the transfer shaft 221, the transfer hub bearings 222, the gears or pulleys 217, 223, the vibratory drive shaft 230, the drive belt or chain 240a, 240b, and the cover 250.

As discussed above, the openings 125 may be defined between each pair of coupled radially outward extending portions 122 and radially outward extending portions 132. In one aspect, the openings 125 are generally bounded by an inner perimeter of the outer supporting bulkheads 120a, 120b and an outer perimeter of the transfer plates 130a, 130b. In one aspect, the openings 125 may be size to allow at least one vibratory pod 210 to pass therethrough. In one aspect, the openings 125 may enable the operator to reach into the drum roller 100 and access the vibratory system 200 without uninstalling or removing any other components or supporting structure of the drum roller 100. In one aspect, if the cover 250 is mounted to one or more of the vibratory pods 210a, 210b, 210c, 210d, the openings 125 may each be configured to enable the operator to reposition or remove the cover 250 to enable access to the vibratory system 200 without uninstalling or removing any other components or supporting structure of the drum roller 100.

In one aspect, a method of performing maintenance on the vibratory pod system 200 mounted to the central bulkhead 170 of the drum roller 100 may include one or more steps. The method may include locating the vibratory pod system 200 mounted to the central bulkhead 170 of the drum roller 100, the drum roller 100 being functionally and rotatably mounted to the vibratory compactor machine 10 via support arm members 35, outer supporting bulkheads 120a, 120b, and transfer plates 130a, 130b. The method may include removing the cover 250 from the vibratory pod system 200 without uninstalling or removing any components or supporting structure of the drum roller 100.

The method may include removing the drive belt or a drive chain 240a, 240b, or a drive gear system (not shown), associated with the vibratory pod system 200 via the opening 125 defined between the outer supporting bulkheads 120a, 120b and the transfer plates 130a, 130b, while the drum roller 100 is functionally and rotatably mounted to the vibratory compactor machine 10 via the support arm members 35, the outer supporting bulkheads 120a, 120b, and the transfer plates 130a, 130b. The method may further include passing the drive belt or the drive chain 240a, 240b, or a drive gear system (not shown), generally axially outward away from a center of the drum roller 100 through the at least one of the openings 125.

The method may include removing the one or more of the gears or pulleys 217, 223 associated with the vibratory pod system 200 via the opening 125 defined between the outer supporting bulkheads 120a, 120b and the transfer plates 130a, 130b, while the drum roller 100 is functionally and rotatably mounted to the vibratory compactor machine 10 via the support arm members 35, the outer supporting bulkheads 120a, 120b, and the transfer plates 130a, 130b. The method may further include passing the gears or pulleys 217, 223 generally axially outward away from the center of the drum roller 100 through the at least one of the openings 125.

The method may include replacing the drive belt or a drive chain 240a, 240b, or a drive gear system (not shown), associated with the vibratory pod system 200 via the opening 125 defined between the outer supporting bulkheads 120a, 120b and the transfer plates 130a, 130b, while the drum roller 100 is functionally and rotatably mounted to the vibratory compactor machine 10 via the support arm members 35, the outer supporting bulkheads 120a, 120b, and the transfer plates 130a, 130b. The method may further include passing the drive belt or the drive chain 240a, 240b, or a drive gear system (not shown), generally axially inward toward the center of the drum roller 100 through at least one of the openings 125.

The method may include replacing the one or more of the gears or pulleys 217, 223 associated with the vibratory pod system 200 via the opening 125 defined between the outer supporting bulkheads 120a, 120b and the transfer plates 130a, 130b, while the drum roller 100 is functionally and rotatably mounted to the vibratory compactor machine 10 via the support arm members 35, the outer supporting bulkheads 120a, 120b, and the transfer plates 130a, 130b. The method may further include passing one or more of the gears or pulleys 217, 223 generally axially inward toward the center of the drum roller 100 through the at least one of the openings 125.

The method may include securing the cover 250 back on to the vibratory pod system 200. Each of the above steps may be performed individually in any order, and may be performed without disassembling the drum roller 100 from the support arm members 35, the outer supporting bulkheads 120a, 120b, and/or the transfer plates 130a, 130b. In one aspect, the step of replacing the drive belt or a drive chain 240a, 240b, or a drive gear system (not shown), or replacing the one or more of the gears or pulleys 217, 223 may include providing a repaired, refurbished, or a new drive belt, drive chain, gear, or pulley.

It can be appreciated by one skilled in the art in view of the present disclosure that any number of components associated with the vibratory pod system 200 may be removed and/or replaced via the openings 125 without disassembly or adjustment of support components, such as the support arm members 35, the outer supporting bulkheads 120a, 120b, and/or the transfer plates 130a, 130b. In one aspect, any number of components associated with the vibratory pod system 200 may be removed and/or replaced via the openings 125 while the drum roller 100 remains functionally supported and coupled to one or more of the support arm members 35, the outer supporting bulkheads 120a, 120b, and the transfer plates 130a, 130b.

It will be appreciated that the foregoing description provides examples of the vibratory pod design as implemented in a vibratory compactor machine. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A vibratory pod system for a vibratory compactor machine, the vibratory pod system comprising:
   a bulkhead defining a first mounting orifice and a plurality of second mounting orifices, the first mounting orifice being defined at a center of the bulkhead and the second mounting orifices being defined radially outward from the first mounting orifice;
   a transfer bearing hub supporting a transfer shaft for transferring rotary motion, the transfer bearing hub being mounted within the first mounting orifice; and
   a plurality of vibratory pods, each of the vibratory pods having a pod shell for rotatably supporting an eccentric mass, wherein each of the vibratory pods is partially inserted through one of the plurality of second mounting orifices and mounted to the bulkhead.

2. The vibratory pod system of claim 1, wherein each of the vibratory pods includes a pod shaft rotatably supporting the eccentric mass within the pod shell, and the pod shaft includes a receiving end extending from the pod shell of the vibratory pod, and
   wherein the pod shaft is rotatably coupled to the transfer shaft of the transfer bearing hub to transfer rotary motion from the transfer shaft to the eccentric mass.

3. The vibratory pod system of claim 2, wherein the pod shaft is rotatably coupled to the transfer shaft via a drive belt, a drive chain, or a drive gear system.

4. The vibratory pod system of claim 1, wherein at least one vibratory pod of the plurality of vibratory pods includes a flange for securing the at least one vibratory pod to a face of the bulkhead, and the at least one vibratory pod partially extends through one of the second mounting orifices beyond an opposite face of the bulkhead.

5. The vibratory pod system of claim 4, wherein the flange radially extends from the at least one vibratory pod to prevent the at least one vibratory pod from passing through the one of the second mounting orifices.

6. The vibratory pod system of claim 4, wherein the at least one of the plurality of vibratory pods includes a pod shaft rotatably supporting the eccentric mass within the at least one vibratory pod, and the pod shaft includes a receiving end extending from the pod shell of the at least one vibratory pod, and
   wherein the pod shaft extends through the one of the second mounting orifices beyond an opposite face of the bulkhead.

7. The vibratory pod system of claim 1, wherein the bulkhead defines an outer perimeter sized for insertion into and secured to an inner circumferential surface of a drum roller of the vibratory compactor machine.

8. The vibratory pod system of claim 7, wherein the outer perimeter of the bulkhead is sized to abut the inner circumferential surface of a drum roller.

9. The vibratory pod system of claim 1, wherein the first mounting orifice and the plurality of second mounting orifices are circular.

10. The vibratory pod system of claim 9, wherein an outer diameter of the first mounting orifice is smaller than an outer diameter of the plurality of second mounting orifices.

11. A vibratory compactor machine comprising:
    a frame including a plurality of support arm members;
    a drum roller having a cylindrical drum shell housing a pair of outer supporting bulkheads and a central bulkhead, the drum roller being supported by the plurality of support arm members on opposite axial sides of the drum rollers via the pair of outer supporting bulkheads; and
    a vibratory pod system including a plurality of vibratory pods supported on the central bulkhead,
    wherein the central bulkhead defines a first mounting orifice and a plurality of second mounting orifices, the first mounting orifice being defined at a center of the central bulkhead and the second mounting orifices being defined radially outward from the first mounting orifice, and
    wherein each of the vibratory pods have a pod shell for rotatably supporting an eccentric mass, and each of the vibratory pods is partially inserted through one of the plurality of second mounting orifices and mounted to the central bulkhead.

12. The vibratory compactor machine of claim 11, wherein the vibratory pod system includes a transfer bearing hub for supporting a transfer shaft to transfer rotary motion from a motor, the transfer bearing hub being mounted within the first mounting orifice.

13. The vibratory compactor machine of claim 12, wherein each of the plurality of vibratory pods includes a pod shaft rotatably supporting the eccentric mass within the vibratory pod, and the pod shaft includes a receiving end extending from the pod shell of the vibratory pod, and
    wherein the pod shaft is rotatably coupled to the transfer shaft of the transfer bearing hub to transfer rotary motion from the transfer shaft to the eccentric mass.

14. The vibratory compactor machine of claim 13, wherein the pod shaft is rotatably coupled to the transfer shaft via a drive belt, a drive chain, or a drive gear system.

15. The vibratory compactor machine of claim 11, wherein at least one vibratory pod of the plurality of vibratory pods includes a flange for securing the at least one vibratory pod to a face of the central bulkhead, and the at least one vibratory pod partially extends through one of the second mounting orifices beyond an opposite face of the central bulkhead.

16. The vibratory compactor machine of claim 15, wherein the flange radially extends from the at least one vibratory pod to prevent the at least one vibratory pod from passing through the one of the second mounting orifices.

17. The vibratory compactor machine of claim 15, wherein the at least one of the plurality of vibratory pods includes a pod shaft rotatably supporting the eccentric mass within the at least one vibratory pod, and the pod shaft includes a receiving end extending from the pod shell of the at least one vibratory pod, and
    wherein the pod shaft extends through the one of the second mounting orifices beyond an opposite face of the central bulkhead.

18. The vibratory compactor machine of claim 11, wherein an outer diameter of the first mounting orifice is smaller than an outer diameter of the plurality of second mounting orifices.

19. The vibratory compactor machine of claim 11, wherein an outer perimeter of the central bulkhead is sized to abut an inner circumferential surface of a drum roller.

20. A method of performing maintenance on a vibratory pod system of claim 1, the method comprising:
    locating the vibratory pod system mounted to a central bulkhead of a drum roller, the drum roller being rotatably mounted to the vibratory compactor machine via support arm members, supporting bulkheads, and transfer plates; and removing a drive belt, a drive chain, or a drive gear system associated with the vibratory pod system via an opening defined between the supporting bulkheads and the transfer plates, while the drum roller is rotatably mounted to the vibratory compactor machine via the support arm members, the supporting bulkheads, and the transfer plates.

\* \* \* \* \*